United States Patent
Liu et al.

(10) Patent No.: US 9,977,924 B2
(45) Date of Patent: May 22, 2018

(54) METHOD AND DEVICE FOR PROVIDING NOTIFICATION INDICATING LOSS OF TERMINAL

(71) Applicant: Beijing Xiaomi Mobile Software Co., Ltd., Beijing (CN)

(72) Inventors: Daokuan Liu, Beijing (CN); Chunhe Yang, Beijing (CN); Yao Tang, Beijing (CN); Shuai Liu, Beijing (CN); Xinyan Xing, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days. days.

(21) Appl. No.: 15/376,107

(22) Filed: Dec. 12, 2016

(65) Prior Publication Data

US 2017/0344762 A1 Nov. 30, 2017

(30) Foreign Application Priority Data

May 24, 2016 (CN) .......................... 2016 1 0346314

(51) Int. Cl.
| | |
|---|---|
| *H04M 1/66* | (2006.01) |
| *G06F 21/88* | (2013.01) |
| *H04W 12/06* | (2009.01) |
| *H04W 12/08* | (2009.01) |
| *G06F 21/32* | (2013.01) |

(52) U.S. Cl.
CPC .............. *G06F 21/88* (2013.01); *G06F 21/32* (2013.01); *H04W 12/06* (2013.01); *H04W 12/08* (2013.01); *G06F 2221/2111* (2013.01)

(58) Field of Classification Search
CPC ........ G06F 21/88; G06F 21/32; H04W 12/06; H04W 12/08

USPC ....................... 455/411, 410, 550.1
See application file for complete search history.

(56) References Cited

U.S. PATENT DOCUMENTS

| | | | |
|---|---|---|---|
| 9,538,335 B1 * | 1/2017 | Bank ................ | H04W 4/028 |
| 2010/0299757 A1 * | 11/2010 | Lee ................ | G06F 21/552 |
| | | | 726/26 |
| 2014/0273880 A1 | 9/2014 | Sima et al. | |
| 2014/0357306 A1 | 12/2014 | Shie | |

(Continued)

FOREIGN PATENT DOCUMENTS

| | | |
|---|---|---|
| CN | 101198119 A | 6/2008 |
| CN | 104700050 A | 6/2015 |

(Continued)

OTHER PUBLICATIONS

Extended Search Report for European Application No. 16193956.6 from the European Patent Office, dated Apr. 10, 2017.

*Primary Examiner* — Khai M Nguyen
(74) *Attorney, Agent, or Firm* — Finnegan, Henderson, Farabow, Garrett & Dunner LLP

(57) ABSTRACT

A method and a device are disclosed for providing a notification indicating a loss of a terminal, the method including obtaining a matching relation between first feature information of a current user of a target terminal and second feature information of a predetermined user. The method also includes controlling a related terminal associated with the target terminal to output a loss notification in response to determining that the matching relation indicates that the first feature information and the second feature information do not match. The loss notification indicates a loss of the target terminal.

16 Claims, 8 Drawing Sheets

(56) References Cited

U.S. PATENT DOCUMENTS

| | | | | |
|---|---|---|---|---|
| 2015/0347857 A1* | 12/2015 | Li | ............................ | G06K 9/00 |
| | | | | 382/116 |
| 2016/0241531 A1* | 8/2016 | Loughlin-McHugh | | H04L 63/102 |
| 2017/0134898 A1* | 5/2017 | Vega | ...................... | H04W 4/023 |
| 2017/0161334 A1* | 6/2017 | Davis, III | ......... | G06F 17/30528 |

FOREIGN PATENT DOCUMENTS

| CN | 104899490 A | 9/2015 |
|---|---|---|
| CN | 105050061 A | 11/2015 |

\* cited by examiner

METHOD AND DEVICE FOR PROVIDING NOTIFICATION INDICATING LOSS OF TERMINAL

CROSS-REFERENCE TO RELATED APPLICATION

This application is based upon and claims priority to Chinese Patent Application Serial No. 201610346314.6, filed with the State Intellectual Property Office of P. R. China on May 24, 2016, the entire content of which is incorporated herein by reference.

TECHNICAL FIELD

The present disclosure relates to the field of communication technology, and more particularly, to a method and device for providing a notification indicating loss of a terminal.

BACKGROUND

With the development of modern communication technology and the improvement of people's living standard, smart phones are provided with various functions, such as making calls, sending messages, shopping, booking tickets, etc. Meanwhile, too much important information is stored in smart phones, such as contact phone numbers, content of messages, various accounts and passwords, and other information.

Because smart phones are expensive, they become targets in the eyes of thieves. Recently, loss of smart phones has become increasingly common. Many users have experienced loss of smart phones, e.g., being stolen by thieves. When the users' smart phones are stolen, it can cause trouble and/or enormous economic loss to the users.

SUMMARY

According to a first aspect of the present disclosure, a method for providing a notification indicating a loss of a terminal is provided. The method includes obtaining a matching relation between first feature information of a current user of a target terminal and second feature information of a predetermined user. The method also includes controlling a related terminal associated with the target terminal to output a loss notification in response to determining that the matching relation indicates that the first feature information and the second feature information do not match. The loss notification indicates a loss of the target terminal.

According to a second aspect of the present disclosure, a server is provided. The server includes a memory for storing instruction. The server also includes a processor configured to execute the instructions to obtain a matching relation between first feature information of a current user of a target terminal and second feature information of a predetermined user. The processor is also configured to execute the instructions to control a related terminal associated with the target terminal to output a loss notification in response to determining that the matching relation indicates that the first feature information and the second feature information do not match.

According to a third aspect of the present disclosure, a non-transitory computer-readable storage medium is provided. The non-transitory computer-readable storage medium has instructions stored therein that, when executed by a processor of a device, cause the device to perform a method for providing a notification indicating a loss of a terminal. The method includes obtaining a matching relation between first feature information of a current user of a target terminal and second feature information of a predetermined user. The method also includes controlling a related terminal associated with the target terminal to output a loss notification in response to determining that the matching relation indicates that the first feature information and the second feature information do not match. The loss notification indicates a loss of the target terminal.

It should be understood that the above general descriptions and the following detail descriptions are explanatory and illustrative, and these descriptions shall not be construed to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise specified. The implementations set forth in the following description of exemplary embodiments do not represent all implementations consistent with the present disclosure. Instead, they are merely examples of devices and methods consistent with some aspects of the present disclosure as recited in the appended claims.

Figure 1:
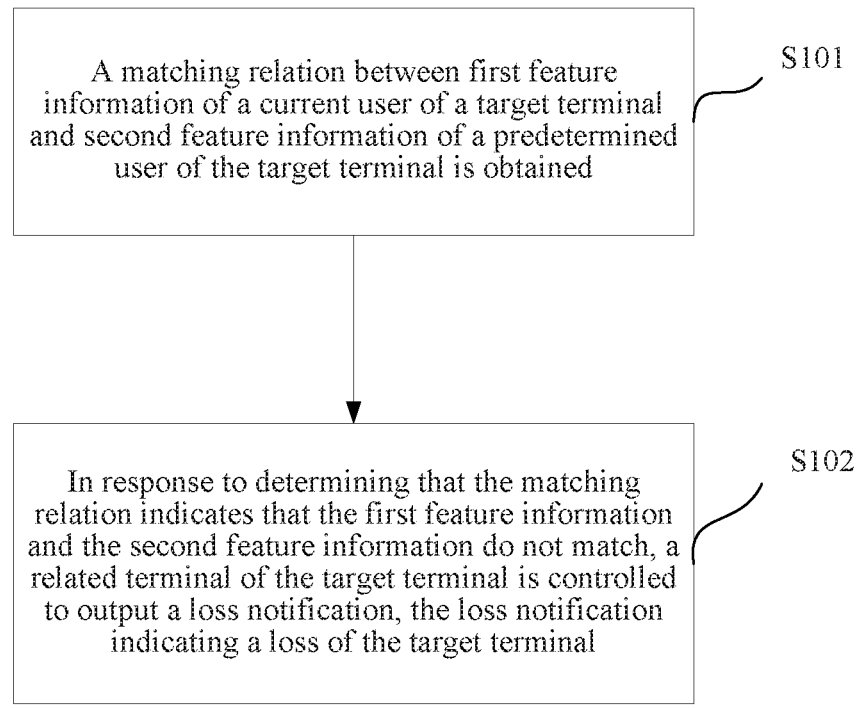
FIG. 1 is a flowchart illustrating a method for providing a notification indicating a loss of a terminal according to an exemplary embodiment of the present disclosure.

FIG. 1 is a flowchart illustrating a method for providing a notification indicating a loss of a terminal according to an embodiment of the present disclosure. As shown in FIG. 1, the method may be implemented by a server. The method includes the following steps.

At step S101, a matching relation between first feature information of a current user of a target terminal and second feature information of a predetermined user of the target terminal is obtained.

In the embodiments of the present disclosure, the target terminal may be a mobile phone, a tablet PC, or a smart band, etc.

Sometimes, the owner of the target terminal may lose the target terminal. For example, the target terminal may be stolen by a thief, or the owner of the target terminal may misplace the target terminal in some place, etc. After the target terminal is lost, in order to avoid more economic loss to the owner of the target terminal that may be caused due to the loss of the target terminal, it is desirable to timely notify the owner of the target terminal that the target terminal is lost, such that the owner becomes aware of the loss in time and can take corresponding actions as soon as possible, for example, calling the police, immediately looking for the target terminal, immediately changing a password of a bank account that has been logged in on the target terminal, or the like.

In some embodiments, the server obtains, in real time, the matching relation between the first feature information of the current user of the target terminal and the second feature information of the predetermined user of the target terminal. Alternatively, in some embodiments, the server obtains the matching relation periodically or regularly. The server determines whether the first feature information is the same as the second feature information according to the matching relation. The server executes step S102 if the first feature information is different from the second feature information.

In some embodiments, the first feature information includes at least one of: fingerprint feature information, iris feature information, and voice feature information of the current user. The second feature information includes at least one of: fingerprint feature information, iris feature information, and voice feature information of the predetermined user. Different people have different feature information.

For example, the voice feature information may include the timbre of voice when a person is speaking. Different persons have different timbres when they speak. The fingerprint feature information may include an image of a fingerprint of a person. Different persons have different fingerprints. The iris feature information may include an image of an iris of a person, which is distinct for different persons.

In the disclosed embodiments, the matching relation between the first feature information of the current user of the target terminal and the second feature information of the predetermined user of the target terminal may be obtained using one of the following two methods.

Figure 2:
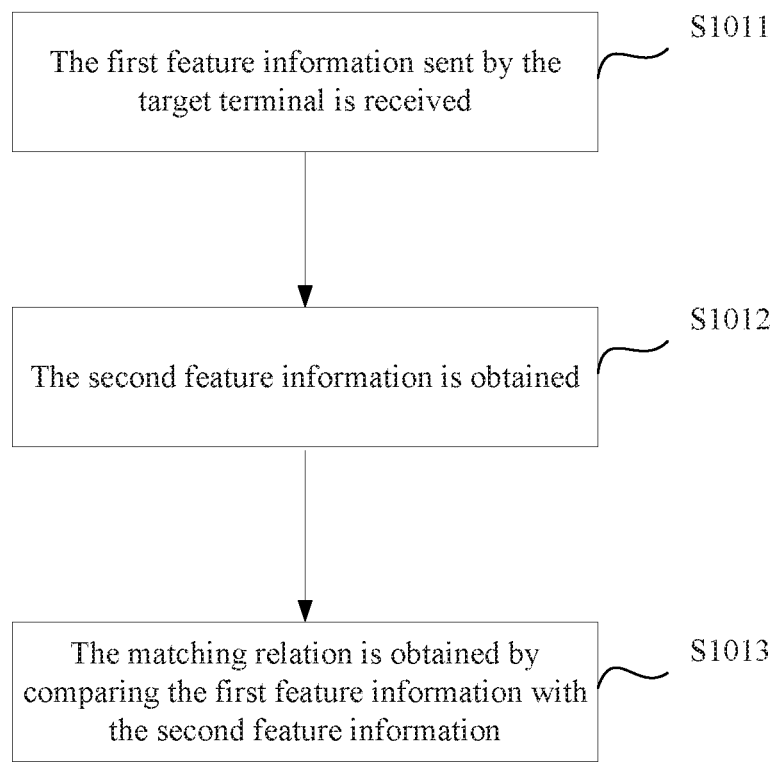
FIG. 2 is a flowchart illustrating a method for providing a notification indicating a loss of a terminal according to another exemplary embodiment of the present disclosure.

The first method includes steps S1011-S1013 shown in FIG. 2. FIG. 2 is a flowchart illustrating a method for providing a notification indicating a loss of a terminal according to another exemplary embodiment of the present disclosure.

At step S1011, the first feature information sent by the target terminal is received.

In some embodiments, the server sends an obtaining request to the target terminal for obtaining the first feature information of the current user of the target terminal. After receiving the obtaining request, the target terminal obtains the first feature information and sends the first feature information to the server. The server receives the first feature information sent by the target terminal.

In some embodiments, when the current user of the target terminal is making a call using the target terminal, the target terminal obtains voice data of the current user of the target terminal when the current user is speaking. For example, in some embodiments, the target terminal obtains the timbre of the voice as the first feature information. Alternatively, in some embodiments, if the screen of the target terminal is in a locked state and the current user of the target terminal needs to unlock the screen of the target terminal, the current user of the target terminal unlocks the screen using a fingerprint. For example, the current user can touch a fingerprint recognition area of the target terminal with a finger. When the current user touches the fingerprint recognition area with a finger, the target terminal obtains an image of a fingerprint of the current user as the first feature information.

At step S1012, the second feature information is obtained.

In the disclosed embodiments, the predetermined user of the target terminal includes the owner of the target terminal, or another person who is trusted by the owner. The other person who is trusted by the owner can be a partner, a child, a parent of the owner, or the like. In descriptions of the disclosed embodiments, the owner of the target terminal is used as an example of a predetermined user of the target terminal. It is understood that the present disclosure does not limit the predetermined user to be the owner of the target terminal.

In some embodiments, the predetermined user of the target terminal stores his or her own feature information in the server in advance. In step S1012, the server directly obtains locally stored second feature information of the predetermined user of the target terminal.

In some embodiments, the predetermined user of the target terminal composes an identifier of the target terminal and his or her own feature information into a record. The predetermined user stores this record in the server as part of a correspondence relation between an identifier of a terminal and feature information. Then, in step S1012, the server obtains the locally stored correspondence relations between identifiers of terminals and feature information. The server also searches for feature information corresponding to an identifier of the target terminal in the correspondence relations between identifiers of terminals and feature information. The feature information found in the search is used as the second feature information.

At step S1013, the matching relation is obtained by comparing the first feature information with the second feature information.

In the disclosed embodiments, in step S1012, a single piece of second feature information or multiple pieces of second feature information may be obtained.

When a single piece of second feature information is obtained, in step S1013, the server determines whether the first feature information is the same as the second feature information. When the server determines that the first feature information is different from the second feature information, a matching relation indicating that the first feature information and the second feature information do not match is generated. When the first feature information is the same as the second feature information, a matching relation indicating that the first feature information matches with the second feature information is generated.

When multiple pieces of second feature information are obtained, the server determines whether the first feature information is included in the multiple pieces of second feature information. When the server determines that the first feature information is not included in the multiple pieces of second feature information, a matching relation indicating that the first feature information and the second feature information do not match is generated. When the first feature information is included in the multiple pieces of second feature information, a matching relation indicating that the first feature information matches with the second feature information is generated.

In a second method, the server sends an obtaining request for obtaining the matching relation between the first feature information of the current user of the target terminal and the second feature information of the predetermined user of the target terminal. After receiving the obtaining request, the target terminal obtains the first feature information of the current user of the target terminal.

In some embodiments, when the current user of the target terminal is making a call using the target terminal, the target terminal obtains voice data of the current user when the current user is speaking. For example, in some embodiments, the target terminal obtains the timbre of the voice as the first feature information. Alternatively, in some embodiments, if the screen of the target terminal is in a locked state and the current user of the target terminal needs to unlock the screen of the target terminal, the current user of the target terminal unlocks the screen using a fingerprint. For example, the current user touches a fingerprint recognition area of the target terminal with a finger. When the current user touches the fingerprint recognition area with a finger, the target terminal obtains a fingerprint image of the current user as the first feature information.

In some embodiments, the predetermined user of the target terminal stores his or her own feature information in the target terminal in advance. Thus, in step S1012, the target terminal directly obtains the locally stored second feature information of the predetermined user of the target terminal.

In some embodiments, the predetermined user of the target terminal composes an identifier of the target terminal and his or her own feature information into a record. The predetermined user stores this record in the target terminal as part of a correspondence relation between an identifier of a terminal and feature information. Then, in step S1012, the target terminal obtains the locally stored correspondence relations between identifiers of terminals and feature information. The target terminal searches for feature information corresponding to the identifier of the target terminal in the correspondence relations between identifiers of terminals and feature information. In some embodiments, the target terminal uses the feature information found in the search as the second feature information.

In the disclosed embodiments, the target terminal may obtain a single piece of second feature information or multiple pieces of second feature information.

When a single piece of second feature information is obtained, in step S1013, the target terminal determines whether the first feature information is the same as the second feature information. When the first feature information is different from the second feature information, a matching relation indicating that the first feature information and the second feature information do not match is generated. When the first feature information is the same as the second feature information, a matching relation indicating that the first feature information matches with the second feature information is generated.

When multiple pieces of second feature information are obtained, the target terminal determines whether the first feature information is included in the multiple pieces of second feature information. When the first feature information is not included in the multiple pieces of second feature information, a matching relation indicating that the first feature information and the second feature information do not match is generated. When the first feature information is included in the multiple pieces of second feature information, a matching relation indicating that the first feature information matches with the second feature information is generated.

After generating the matching relation, the target terminal sends the matching relation to the server. The server receives the matching relation sent by the target terminal.

At step S102, in response to determining that the matching relation indicates that the first feature information and the second feature information do not match, a related terminal associated with the target terminal is controlled to output a loss notification. The loss notification indicates a loss of the target terminal.

When the matching relation indicates that the first feature information and the second feature information do not match, the owner of the target terminal may have lost the target terminal. For example, the target terminal may have been stolen, or the owner may have misplaced the target terminal in some place, etc.

Figure 3:
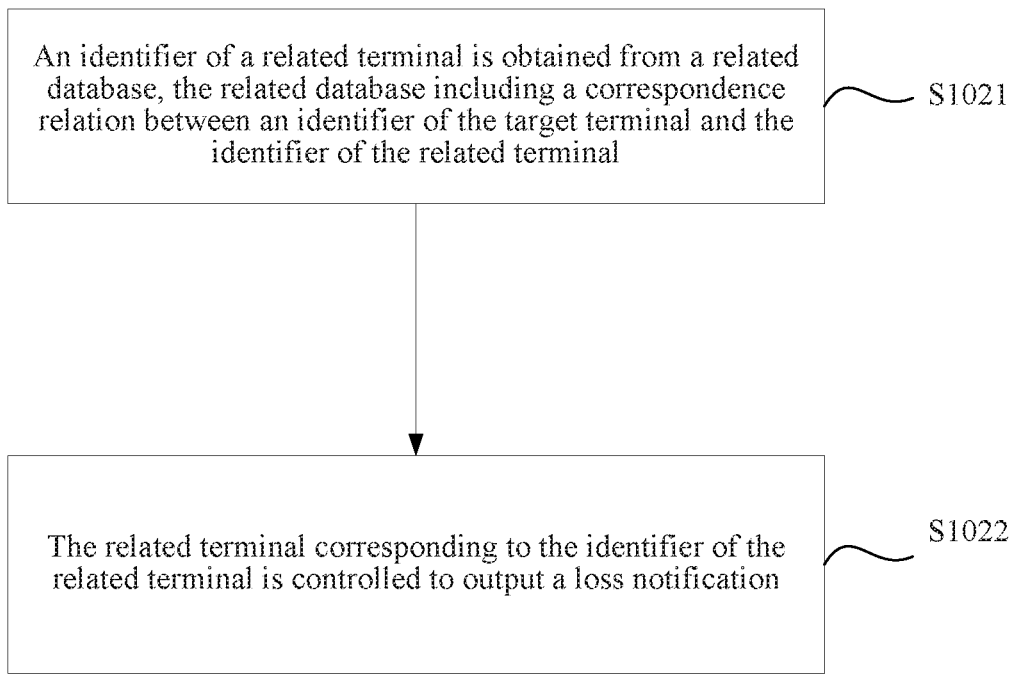
FIG. 3 is a flowchart illustrating a method for providing a notification indicating a loss of a terminal according to another exemplary embodiment of the present disclosure.

FIG. 3 is a flowchart illustrating a method for providing a notification indicating a loss of a terminal according to another exemplary embodiment of the present disclosure. Referring to FIG. 3, step S102 shown in FIG. 1 can be implemented through steps S1021-S1022.

At step S1021, an identifier of a related terminal is obtained from a related database. The related database includes a correspondence relation between an identifier of the target terminal and the identifier of the related terminal.

The related terminal may be a mobile phone, a tablet PC, or a smart band, etc.

The related terminal may be another terminal owned by the owner, or a terminal owned by another person who is trusted by the owner of the target terminal, such as a terminal owned by a partner, a child, or a parent of the owner, etc.

The related terminal may include a terminal on which a target account is logged in. The target account may be the same as an account that is logged-in on the target terminal. Alternatively, the target account may be the same as an account associated with the account that is logged-in on the target terminal.

The target account may be an account of the owner of the target terminal, such as a bank account or telephone number of the owner of the target terminal, etc. The owner of the target terminal may preset a related account of the target account in the server. For example, if the target account is the telephone number of the target terminal, the related account may be a telephone number set by the owner that is bound or linked to the telephone number, such as a family number, etc.

In the disclosed embodiments, the owner of the target terminal may preset an identifier of the related terminal associated with the target terminal in the related database. For example, in some embodiments, a correspondence relation between the identifier of the target terminal and the identifier of the related terminal is generated. The generated correspondence relation is stored in the related database. The related database is stored in the server or in another device. If the related database is stored in the server, in step S1021, the server obtains the related database locally. If the related database is stored in another device, in step S1021, the server obtains the related database from another device.

In some embodiments, after obtaining the related database, the server obtains the correspondence relation between the identifier of the target terminal and that of the related terminal from the related database. The server then obtains the identifier of the related terminal from the correspondence relation.

At step S1022, the related terminal corresponding to the identifier of the related terminal is controlled to output a loss notification.

In some embodiments, the server sends a loss notification instruction to the related terminal corresponding to the identifier of the related terminal. The loss notification instruction is configured for instructing the related terminal to output the loss notification. In some embodiments, the loss notification instruction carries the identifier of the target terminal.

In some embodiments, after receiving the loss notification instruction, the related terminal extracts the identifier of the target terminal from the loss notification instruction. The related terminal outputs the loss notification according to the identifier of the target terminal and current location information of the target terminal. The loss notification is configured for indicating the loss of the target terminal.

Text or sound (e.g., voice) may be used for indicating the loss of the target terminal. For example, in some embodiments, the related terminal displays text on a screen of the related terminal to indicate that the target terminal corresponding to the identifier of the target terminal is lost. In some embodiments, the related terminal outputs a voice indicating that the target terminal corresponding to the identifier of the target terminal is lost, such that the owner of the target terminal can take corresponding actions as soon as possible after receiving the loss notification sent by the related terminal. For example, the owner may call the police, immediately look for the target terminal, immediately change a password of a bank account stored in the target terminal, or the like. In this way, more economic loss to the owner of the target terminal due to the loss of the target terminal can be avoided.

In some embodiments, the loss notification indicates at least one of current location information of the target terminal and facial feature information of the current user.

In some embodiments, the server sends an obtaining request for obtaining the current location information of the target terminal. After receiving the obtaining request, the target terminal locates the target terminal using a built-in locating device in the target terminal to obtain the current location information of the target terminal. The target terminal sends the current location information to the server. The server receives the current location information of the target terminal sent by the target terminal.

In some embodiments, the server sends an obtaining request for obtaining the facial feature information of the current user. After receiving the obtaining request, the target terminal captures the facial feature information of the current user using a camera installed on the target terminal (for example, photographing a picture of face of the current user), and sends the captured facial feature information of the current user to the server. The server receives the facial feature information of the current user sent by the target terminal.

In this way, the related terminal outputs the current location information of the target terminal and/or the facial feature information of the current user when outputting the loss notification. As a result, when the owner of the target terminal knows that the target terminal is lost through the loss notification output by the related terminal, the owner also knows the current location information of the target terminal, the facial feature information of the current user, etc. Efficiency is improved when the owner searches for the target terminal according to the current location information of the target terminal, facial feature information of the current user, or the like.

Further, if an account (such as a telephone number or a bank account etc.) of the owner of the terminal target is logged in on the target terminal, in order to prevent the property of the owner associated with the account from being stolen or damaged, after step S102, the server controls the target terminal to enable the target terminal to log out of the logged-in account. In this way, the current user of the target terminal cannot use the account to conduct illegal acts, thereby preventing the property of the owner from being stolen or damaged.

In the disclosed embodiments, the matching relation between the feature information of the current user of the target terminal and the feature information of the predetermined user of the target terminal is obtained. In response to determining that the matching relation indicates a mismatch, the related terminal associated with the target terminal is controlled to output the loss notification. With the disclosed methods and devices, when the server determines that the current user is different from the predetermined user of the target terminal, which indicates that the target terminal may be lost, the server controls the related terminal associated with the target terminal to output the loss notification. The loss notification enables the owner of the target terminal to become aware of the loss of the target terminal in time, such that the owner can take corresponding actions as soon as possible, such as calling the police, immediately looking for the target terminal, immediately changing a password of a bank account stored in the target terminal, or the like. In this way, more economic loss to the owner of the target terminal due to the loss of the target terminal can be avoided.

Figure 4:
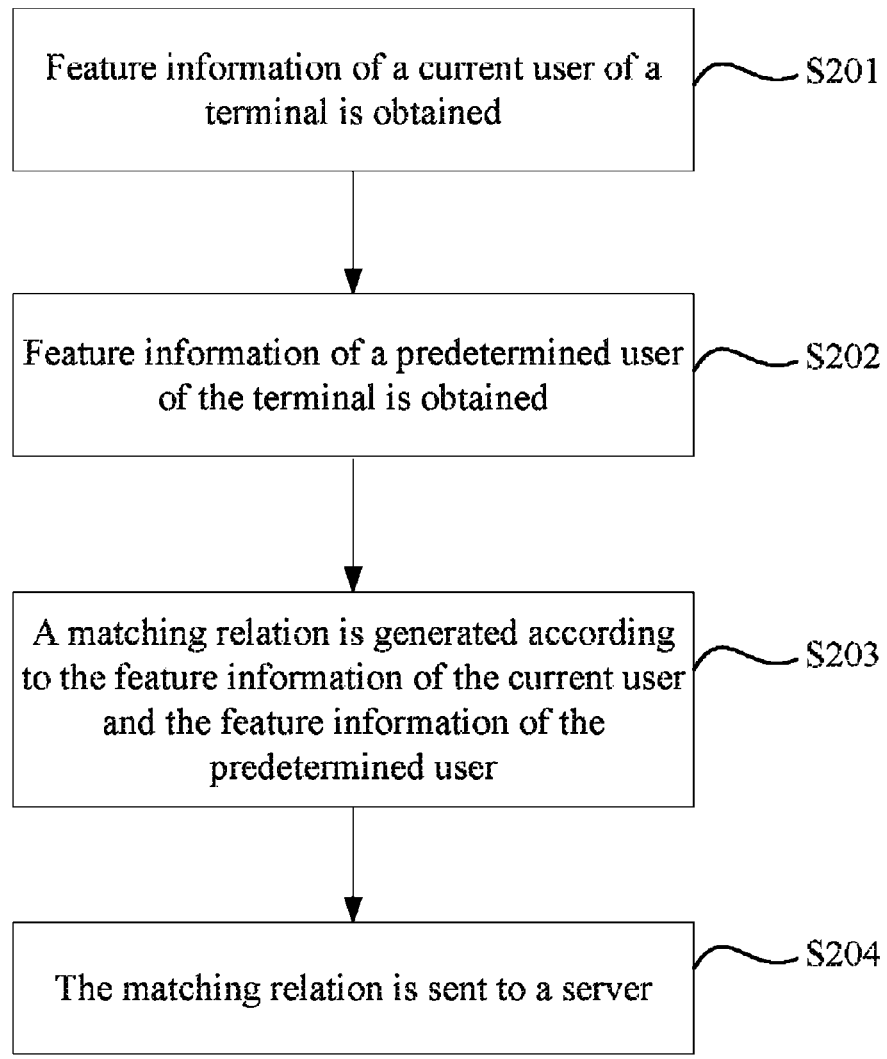
FIG. 4 is a flowchart illustrating a method for providing a notification indicating a loss of a terminal according to another exemplary embodiment of the present disclosure.

FIG. 4 is a flowchart illustrating a method for providing a notification indicating a loss of a terminal according to another embodiment of the present disclosure. As shown in FIG. 4, the method is implemented by a terminal, and includes the following steps.

At step S201, feature information of a current user of the terminal is obtained.

When the server needs to obtain a matching relation between the feature information of the current user of the terminal and feature information of a predetermined user of the terminal, the server sends an obtaining request for obtaining the matching relation between the feature information of the current user of the terminal and the feature information of the predetermined user of the terminal. After receiving the obtaining request, the terminal obtains the feature information of the current user of the terminal.

In some embodiments, when the current user of the terminal is making a call using the terminal, the terminal obtains voice data when the current user of the terminal is speaking. For example, in some embodiments, the terminal obtains timbre of the voice as the feature information of the current user of the terminal. Alternatively, in some embodiments, if a screen of the terminal is in a locked state and the current user of the terminal needs to unlock the screen of the terminal, the current user of the terminal unlocks the screen using a fingerprint. For example, the current user touches a fingerprint recognition area of the terminal with a finger. When the current user touches the fingerprint recognition area with the finger, the terminal may obtain an image of a fingerprint of the current user as the feature information of the current user of the terminal.

At step S202, feature information of the predetermined user of the terminal is obtained.

In the disclosed embodiments, the predetermined user of the terminal includes the owner of the terminal, or another person who is trusted by the owner. The other person who is trusted in by the owner may be a partner, a child, a parent of the owner, or the like. In the descriptions of the disclosed embodiments, the owner of the terminal is used as an example of the predetermined user of the terminal. It is understood that the present disclosure does not limit the predetermined user to be the owner.

In some embodiments, the predetermined user of the terminal stores his or her own feature information into the terminal in advance. Thus, in step S202, the terminal directly obtains locally stored the feature information of the predetermined user of the terminal.

For example, in some embodiments, the predetermined user of the terminal composes an identifier of the terminal and his or her own feature information into a record. The predetermined user stores this record as part of a correspondence relation between an identifier of a terminal and feature information. Then, in step S202, the terminal obtains the correspondence relations between identifiers of terminals and feature information stored locally. The terminal searches for feature information corresponding to the identifier of the terminal in the correspondence relations between identifiers of terminals and feature information. The feature information found in the search is used as the feature information of the predetermined user of the terminal.

At step S203, a matching relation is generated according to the feature information of the current user and the feature information of the predetermined user.

In some embodiments, after obtaining the feature information of the current user of the terminal and obtaining the feature information of the predetermined user of the terminal, the terminal generates the matching relation according to the feature information of the current user of the terminal and the feature information of the predetermined user of the terminal, and then executes step S204.

At step S204, the matching relation is sent to a server.

In some embodiments, after obtaining the matching relation between the feature information of the current user of the terminal and the feature information of the predetermined user of the terminal, the server controls a related terminal associated with the terminal to output a loss notification in response to determining that the matching relation indicates a mismatch. With the disclosed methods, when the server determines that the current user of the terminal is different from the predetermined user of the terminal, which indicates that the terminal may be lost, the server controls the related terminal associated with the terminal to output the loss notification. The loss notification enables the owner of the terminal to become aware of the loss of the terminal in time, such that the owner can take corresponding actions as soon as possible, such as calling the police, immediately looking for the terminal, or immediately changing a password of a bank account stored in the terminal, or the like. In this way, more economic loss to the owner of the terminal due to the loss of the terminal can be avoided.

The implementations disclosed herein do not depart from the spirit and scope of the present disclosure.

Figure 5:
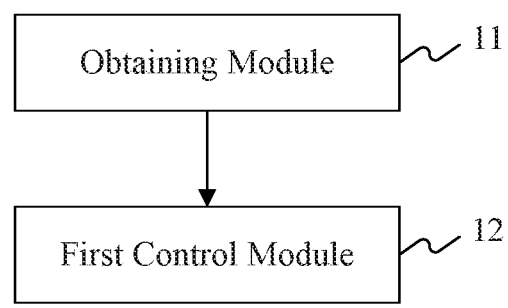
FIG. 5 shows a block diagram of a device for providing a notification indicating a loss of a terminal according to an exemplary embodiment of the present disclosure.

FIG. 5 is a block diagram of a device for providing a notification indicating a loss of a terminal according to an embodiment of the present disclosure. As shown in FIG. 5, the device is implemented by as at least part of a server. The device includes an obtaining module 11 and a first control module 12.

The obtaining module 11 is configured to obtain a matching relation between first feature information of a current user of a target terminal and second feature information of a predetermined user of the target terminal.

The first control module 12 is configured to control a related terminal associated with the target terminal to output a loss notification in response to determining that the matching relation obtained by the obtaining module 11 indicates that the first feature information and the second feature information do not match. The loss notification indicates a loss of the target terminal.

Figure 6:
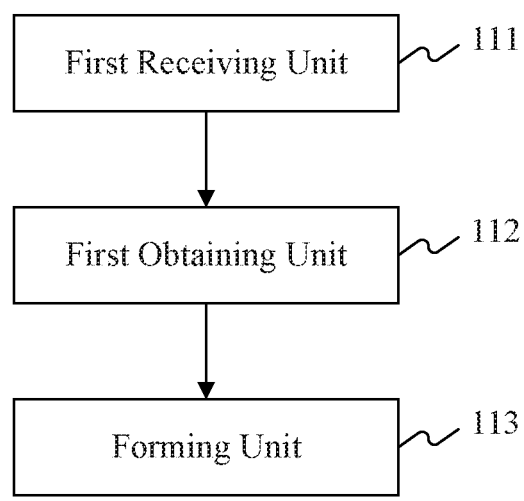
FIG. 6 shows a block diagram of a device for providing a notification indicating a loss of a terminal according to another exemplary embodiment of the present disclosure.

FIG. 6 shows a block diagram of a device for providing a notification indicating a loss of a terminal according to another exemplary embodiment of the present disclosure. Referring to FIG. 6, the obtaining module 11 includes a first receiving unit 111, a first obtaining unit 112, and a forming unit 113.

The first receiving unit 111 is configured to receive the first feature information sent by the target terminal.

The first obtaining unit 112 is configured to obtain the second feature information.

The forming unit 113 is configured to obtain the matching relation by comparing the first feature information received by the first receiving unit 111 with the second feature information obtained by the first obtaining unit 112.

In some embodiment, the obtaining module 11 may include a second receiving unit. The second receiving unit may be configured to receive the matching relation sent by the target terminal.

The matching relation indicates that the first feature information and the second feature information do not match, if the second feature information obtained by the first obtaining unit 112 does not include the first feature information received by the first receiving unit 111.

Figure 7:
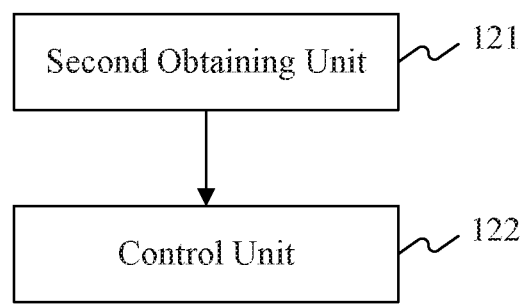
FIG. 7 shows a block diagram of a device for providing a notification indicating a loss of a terminal according to another exemplary embodiment of the present disclosure.

FIG. 7 shows a block diagram of a device for providing a notification indicating a loss of a terminal according to another exemplary embodiment of the present disclosure. Referring to FIG. 7, the first control module 12 includes a second obtaining unit 121 and a control unit 122.

The second obtaining unit 121 is configured to obtain an identifier of the related terminal from a related database. The related database includes a correspondence relation between an identifier of the target terminal and the identifier of the related terminal.

The control unit 122 is configured to control the related terminal corresponding to the identifier of the related terminal obtained by the second obtaining unit 121 to output the loss notification.

The related terminal may include a terminal on which a target account is logged in. The target account may be the same as an account that is logged-in on the target terminal. Alternatively, the target account may be the same as an account associated with the account that is logged-in on the target terminal.

The loss notification includes at least one of current location information of the target terminal and facial feature information of the current user.

The first feature information includes at least one of: fingerprint feature information, iris feature information, and voice feature information of the current user. The second feature information includes at least one of: fingerprint feature information, iris feature information, and voice feature information of the predetermined user.

In some embodiments, the device may further include a second control module. The second control module may be configured to control the target terminal to enable a currently logged-in account to be logged out, in response to determining that the matching relation indicates that the first feature information and the second feature information do not match.

In some embodiments, the matching relation between the feature information of the current user of the target terminal and the feature information of the predetermined user of the target terminal is obtained. In response to determining that the matching relation indicates a mismatch, the related terminal associated with the target terminal is controlled to output the loss notification. With the disclosed methods, when the server determines that the current user is different from the predetermined user of the target terminal, which indicates that the target terminal may be lost, the server controls the related terminal associated with the target terminal to output the loss notification. The loss notification enables the owner of the target terminal to become aware of the loss of the target terminal in time, such that the owner can take corresponding actions as soon as possible, such as calling the police, immediately looking for the target terminal, or immediately changing a password of a bank account stored in the target terminal, or the like. In this way, more economic loss to the owner of the target terminal due to the loss of the target terminal can be avoided.

Figure 8:
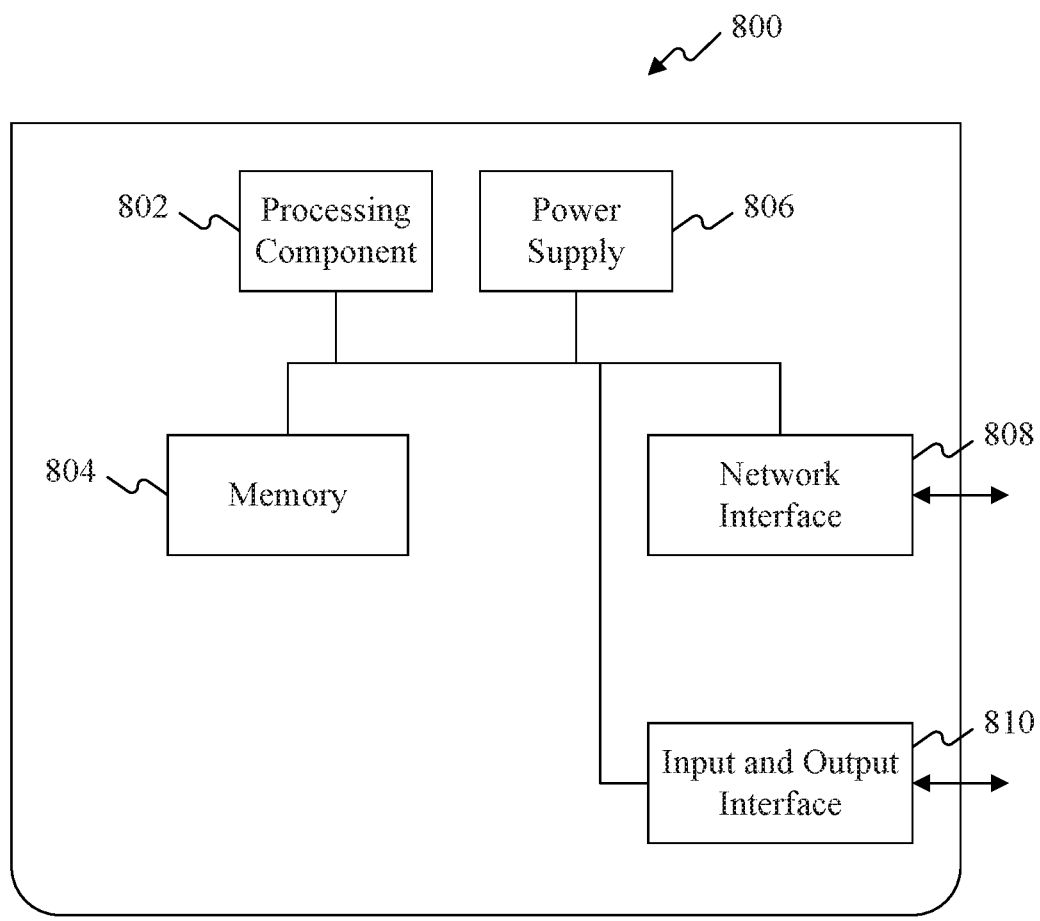
FIG. 8 shows a block diagram of a server according to an exemplary embodiment of the present disclosure.

FIG. 8 is a block diagram of a server 800 according to an exemplary embodiment of the present disclosure. The server 800 may be provided as an embodiment of the server described above.

Referring to FIG. 8, the server 800 includes a processing component 802 (including one or more processors), and memory resource represented by a memory 804 for storing instructions (such as application programs) executable by the processing component 802. The application programs stored in the memory 804 may include one or more modules. Each module may correspond to a set of instructions. Furthermore, the processing component 802 may be configured to execute instructions so as to execute the methods described herein that may be performed by the server.

Referring to FIG. 8, the server 800 further includes a power supply 806 configured to manage the power of the server 800, a wired or wireless network interface 808 configured to connect the server 800 to a network, and an input and output interface 810. The server 800 operates based on an operating system stored in the memory 804, such as Windows Server™, Mac OS X™, Unix™, Linux™, FreeBSD™, and so on.

Other embodiments of the disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a server to provide a notification indicating a loss of a terminal, the server including a processor and a memory storing instructions executable by the processor, the method comprising:
   obtaining, by the processor, a matching relation between first feature information of a current user of a target terminal and second feature information of a predetermined user;
   obtaining, by the processor, an identifier of a related terminal associated with the target terminal from a related database, wherein the related database comprises a correspondence relation between an identifier of the target terminal and the identifier of the related terminal; and
   controlling, by the processor, the related terminal corresponding to the identifier of the related terminal to output a loss notification in response to determining that the matching relation indicates that the first feature information and the second feature information do not match,
   wherein the loss notification indicates a loss of the target terminal, the first feature information includes biometric feature information of the current user, and the second feature information includes biometric feature information of the predetermined use,
   wherein the related terminal comprises a terminal on which a target account is logged in, and
   the target account is the same as an account that is logged-in on the target terminal or the same as an account associated with the account that is logged-in on the target terminal.

2. The method according to claim 1, wherein obtaining the matching relation between the first feature information of the current user of the target terminal and the second feature information of the predetermined user comprises:
   receiving the first feature information sent by the target terminal;
   obtaining the second feature information; and
   obtaining the matching relation by comparing the first feature information with the second feature information.

3. The method according to claim 1, wherein obtaining the matching relation between the first feature information of the current user of the target terminal and the second feature information of the predetermined user comprises:
   receiving the matching relation sent by the target terminal.

4. The method according to claim 1, wherein the matching relation indicates that the first feature information and the second feature information do not match, when the second feature information does not include the first feature information.

5. The method according to claim 1, wherein the loss notification comprises at least one of: current location information of the target terminal and facial feature information of the current user.

6. The method according to claim 1, wherein the first feature information comprises at least one of: fingerprint feature information, iris feature information, and voice feature information of the current user; and
   the second feature information comprises at least one of: fingerprint feature information, iris feature information, and voice feature information of the predetermined user.

7. The method according to claim 1, further comprising:
   controlling the target terminal to enable a currently logged-in account to be logged out, in response to determining that the matching relation indicates that the first feature information and the second feature information do not match.

8. A server, comprising:
a memory for storing instruction;
a processor configured to execute the instructions to:
obtain a matching relation between first feature information of a current user of a target terminal and second feature information of a predetermined user;
obtain an identifier of a related terminal associated with the target terminal from a related database, wherein the related database comprises a correspondence relation between an identifier of the target terminal and the identifier of the related terminal; and
control the related terminal corresponding to the identifier of the related terminal to output a loss notification in response to determining that the matching relation indicates that the first feature information and the second feature information do not match,
wherein the first feature information includes biometric feature information of the current user, and the second feature information includes biometric feature information of the predetermined user,
the related terminal comprises a terminal on which a target account is logged in, and
the target account is the same as an account that is logged-in on the target terminal or the same as an account associated with the account that is logged-in on the target terminal.

9. The server according to claim 8, wherein the processor is configured to execute the instructions to obtain the matching relation between the first feature information of the current user of the target terminal and the second feature information of the predetermined user by:
receiving the first feature information sent by the target terminal;
obtaining the second feature information; and
obtaining the matching relation by comparing the first feature information with the second feature information.

10. The server according to claim 8, wherein the processor is configured to execute the instructions to obtain the matching relation between the first feature information of the current user of the target terminal and the second feature information of the predetermined user by:
receiving the matching relation sent by the target terminal.

11. The server according to claim 8, wherein the matching relation indicates that the first feature information and the second feature information do not match, when the second feature information does not include the first feature information.

12. The server according to claim 8, wherein the loss notification comprises at least one of: current location information of the target terminal and facial feature information of the current user.

13. The server according to claim 8, wherein
the first feature information comprises at least one of: fingerprint feature information, iris feature information, and voice feature information of the current user; and
the second feature information comprises at least one of: fingerprint feature information, iris feature information, and voice feature information of the predetermined user.

14. The server according to claim 8, wherein the processor is further configured to execute the instructions to:
control the target terminal to enable a currently logged-in account to be logged out, in
response to determining that the matching relation indicates that the first feature information and the second feature information do not match.

15. A non-transitory computer-readable storage medium having instructions stored therein that, when executed by a processor of a device, cause the device to perform a method for providing a notification indicating a loss of a terminal, the method comprising:
obtaining, by the processor, a matching relation between first feature information of a current user of a target terminal and second feature information of a predetermined user;
obtaining, by the processor, an identifier of a related terminal associated with the target terminal from a related database, wherein the related database comprises a correspondence relation between an identifier of the target terminal and the identifier of the related terminal; and
controlling, by the processor, the related terminal corresponding to the identifier of the related terminal to output a loss notification in response to determining that the matching relation indicates that the first feature information and the second feature information do not match, wherein the loss notification indicates a loss of the target terminal, the first feature information includes biometric feature information of the current user, and the second feature information includes biometric feature information of the predetermined user,
wherein the related terminal comprises a terminal on which a target account is logged in, and
the target account is the same as an account that is logged-in on the target terminal or the same as an account associated with the account that is logged-in on the target terminal.

16. The non-transitory computer-readable storage medium according to claim 15, wherein controlling the related terminal associated with the target terminal to output the loss notification comprises:
obtaining an identifier of the related terminal from a related database, wherein the related database comprises a correspondence relation between an identifier of the target terminal and the identifier of the related terminal; and
controlling the related terminal corresponding to the identifier of the related terminal to output the loss notification.

* * * * *